Jan. 21, 1930. F. L. JACOBS 1,744,311
REMOVABLE BODY FOR HAND TRUCKS
Filed June 7, 1928
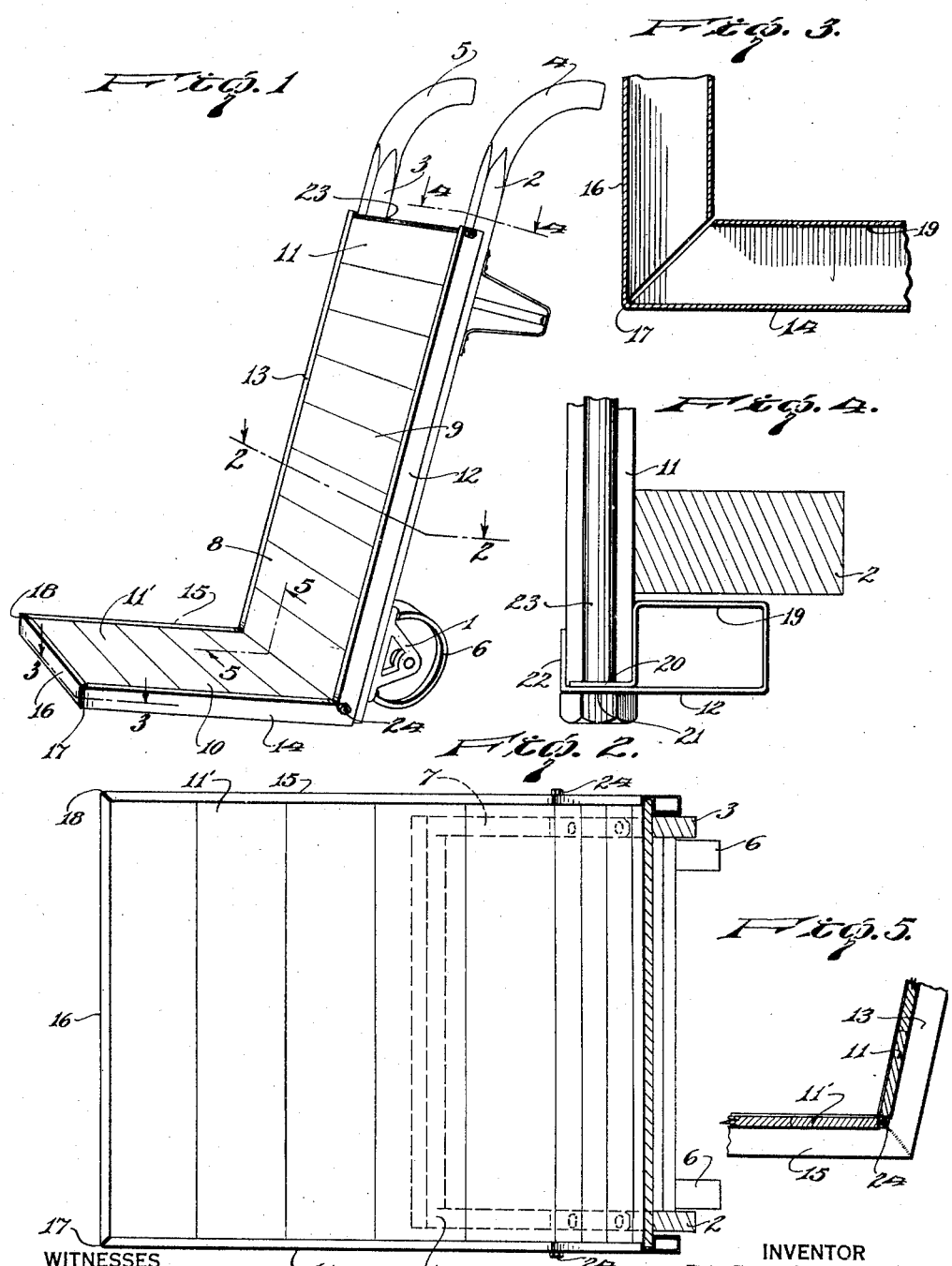

Patented Jan. 21, 1930

1,744,311

UNITED STATES PATENT OFFICE

FREDERICK L. JACOBS, OF NEWARK, NEW JERSEY

REMOVABLE BODY FOR HAND TRUCKS

Application filed June 7, 1928. Serial No. 283,552.

This invention relates to attachments for hand trucks and particularly to an improved removable body, the object being to provide a construction which will coact with a hand truck for properly supporting loads of different sizes.

Another object of the invention is to provide a removable body for hand trucks, whereby the body may be loaded at a point distant from the hand truck and later engaged by the hand truck for transportation.

Another object, more specifically, is to provide a removable body for hand trucks which is formed with side members constructed to interlock to a certain extent with the hand truck so as to properly be supported by the truck either when empty or when carrying a load.

In the accompanying drawing,—

Figure 1 is a perspective view of a removable body for a hand truck disclosing an embodiment of the invention, the same being shown mounted on a truck;

Figure 2 is a sectional view through Figure 1 approximately on the line 2—2, the same being on an enlarged scale;

Figure 3 is an enlarged fragmentary sectional view through Figure 1 on the line 3—3;

Figure 4 is a fragmentary sectional view through Figure 1 on the line 4—4;

Figure 5 is an enlarged fragmentary sectional view through Figure 1 on the line 5—5.

Referring to the accompanying drawing by numerals, 1 indicates the truck as a whole and 2 and 3 the usual arms of a truck merging into grips 4 and 5. The arms at the lower end are connected in a suitable manner and are properly supported by the wheels 6. A reach 7 is connected with the arms 2 and 3 in the usual manner and acts to support the removable body 8. The parts from 1 to 7 inclusive are old and well-known and are the usual parts of trucks now in common use, and therefore form no part of the present invention except in combination. The body 8 is provided with what may be termed a back 9 and a lower end or bottom 10. The bottom 10 is set at the same angle from back 8 as reach 7 is in respect to the arms 2 and 3. In this way the body 8 properly fits against the arms and against the reach 7. The body 8 is formed with a number of boards 11 in back 9 and similar boards 11' in bottom 10. Side bars 12 and 13 are provided for the back 9, said side bars being preferably integral with the side bars 14 and 15 of bottom 10. Preferably the side bars 14 and 15 are integral with an end section 16. From this it will be seen that the members 12 to 16 inclusive are all formed from a single piece of metal. In cross-section this metal appears as shown in Figure 4 except at the corners 17 and 18 where a single thickness of metal is provided, as shown in Figure 3. By bending a piece of sheet metal, as shown, it will be noted that the bar 12 and also the other bars are formed into a rectangular hollow beam 19, as shown in Figure 4, with extensions 20, 21 and 22 forming a channel structure into which the ends of the boards 11 and 11' extend. By bending the metal as just described a channel is provided for the boards and a reinforcing and stiffening beam provided beneath the ends of the boards, so that an exceptionally strong, rigid structure is provided. All parts of the hollow beam 19 are cut away at the corners 17 and 18, except the outer surface, and as the metal is comparatively resilient this permits the side bars 12 and 14 to be swung somewhat away from the side bars 13 and 15 when inserting or removing any of the boards 11 or 11'. In order to hold the side bars rigidly in place so as to pinch the ends of the boards 11 and 11', clamping bolts 23 and 24 are provided and act to draw the side bars toward each other and firmly against the various boards. Bolt 23, as shown particularly in Figure 4, extends along the edge of the uppermost board 11, whereby these boards cannot accidently move out of place. Bolt 24, as shown in Figure 5, is arranged between the lowermost board 11 and one of the end boards 11', whereby longitudinal movement of the boards cannot take place, even if the bolts should become somewhat loose. If any of the boards 11 or 11' should become worn or should be broken, the bolts may be removed and the side bars spread apart, said bars springing or hinging at points 17 and 18. The boards may then be readily removed and new ones substituted and the bars swung back to their former position and bolts 23 and 24 restored.

In use the parts are arranged in the position shown in Figure 1, so that the truck may transport the body as desired. If desired, the body may be loaded with merchandise when the truck is at some distant point and then the truck may be drawn over to the body and the reach 7 slid under the boards 11' by reason of the fact that the hollow beam 19 supports these boards somewhat above the ground. After thus connecting the truck to the body the truck and body may be moved to a desired point and the body discharged with its load of merchandise. The truck may then be moved for a second body with a second load and so on as often as desired. In this way the truck is in substantially continuous use for transporting purposes, while a number of bodies may be used to hold the goods until properly disposed of.

What I claim is:—

1. In a removable body for hand trucks, a plurality of bars forming an enclosing structure, each of said bars being formed to present a substantially rectangular hollow beam and a channel iron, a plurality of independent boards slidably fitted into said channel iron, and bolts connecting said bars, said bolts being positioned to prevent any spreading of said bars and any sliding movement of said boards.

2. A removable body for hand trucks, comprising an enclosing bar structure, boards held in position by said bar structure, and bolts for holding the bar structure in position and for preventing any independent sliding movement of said boards, said bar structure being formed with a rectangular supporting hollow beam and a channel for receiving the ends of said boards, said beam being positioned to engage said boards near one end on one face.

3. A removable body for hand trucks, comprising a frame having channel iron portions, said frame having a back section formed of two parallel members and a bottom section formed of a front member and two parallel side members swingably connected to the front member, said two parallel members of the back section being rigidly connected with the two parallel side members, whereby all of said parallel members may swing, a plurality of boards fitted into the channel iron portions of said back section and said bottom section, and a plurality of bolts connecting the parts of said frame for clamping the frame against the ends of said boards.

FREDERICK L. JACOBS.